3,417,129
PROCESS FOR THE MANUFACTURE OF ACETO-
ACETIC ACID METHYL ESTER AND ACETO-
ACETIC ACID ETHYL ESTER
Otto Probst and Lothar Hörnig, Frankfurt am Main, and
Lothar Hirsch, Kelkheim, Taunus, Germany, assignors
to Farbwerke Hoechst Aktiengesellschaft vormals
Meister Lucius & Brüning, Frankfurt am Main, Germany, a corporation of Germany
No Drawing. Filed June 22, 1965, Ser. No. 466,114
Claims priority, application Germany, June 26, 1964,
F 43,266
3 Claims. (Cl. 260—483)

ABSTRACT OF THE DISCLOSURE

A process has been provided for producing acetoacetic acid methyl ester and acetoacetic acid ethyl ester by reacting a diketene with methyl alcohol or ethyl alcohol in the presence of specific amines to produce the acid ester. Of the various advantages accruing by the use of the specific amines as an esterification catalyst, the ease of separation, the reduction of the distillation requirements and a more easily handled residual sump product are only a few. A continuous process has provided especially attractive advantages.

---

The present invention relates to a process for the manufacture of acetoacetic acid methyl ester and acetoacetic acid ethyl ester, respectively.

It is known that alcohols can be reacted with diketene in the presence of basic catalysts to obtain acetoacetic esters. As catalysts for this reaction, tertiary amines such as triethylamine, pyridine and triethanolamine have been used besides basic salts, for example, sodium acetate, sodium phosphate and borax.

When the above process is used for the manufacture on an industrial scale of acetoacetic acid methyl ester and acetoacetic acid ethyl ester, considerable disadvantages are encountered. If, for example, basic salts are used as catalysts, satisfactory yields can only be obtained by simultaneously adding acetic acid or another carboxylic acid. The acid must be removed again by distillation in the processing of the crude mixture containing the acetoacetic ester, which requires great capital investment for apparatus.

The yield obtained by the known process can be improved by using tertiary amines as catalysts. It has been found, however, that not all tertiary amines lead to good yields. When, for example, tribenzylamine is used as the catalyst, the yield of acetoacetic acid methyl ester amounts only to 23%; with N,N-dimethyl-α-naphthylamine it is only 24%; with N,N,N',N'-tetramethyl-methylenediamine only 36% and with triethanolamine only 66%.

A group of tertiary amines such as trimethylamine, triethylamine and pyridine have the great disadvantage of forming a maximum azeotrope with acetic acid which is present in relatively large amounts in the crude ester mixture particularly when a commercial diketene is used as a starting material. The boiling point of the maximum azeotrope is near the boiling points of acetoacetic acid methyl ester and acetoacetic acid ethyl ester so that processing on an industrial scale of the crude ester mixture is rendered difficult.

It has also been proposed to add a strong acid for example, sulfuric acid or phosphoric acid, to the crude ester mixture before distillation, in order to bind the tertiary amine with formation of salt. It has been found, however, that salt formation is incomplete in the non-aqueous medium if an equivalent amount of acid is used. If the acid is used in excess, the stability of the acetoacetic ester is impaired and relatively large amounts of ester are destroyed during distillation.

Now we have found that the above difficulties encountered in the manufacture of acetoacetic acid methyl ester and acetoacetic acid ethyl ester can be avoided and the said esters can be obtained in a high yield and with a high purity, by carrying out the reaction of methanol or ethanol with diketene under otherwise known conditions in the presence of at least one tertiary amine of the following formula

in which $R_1$ and $R_2$ represent identical or different alkyl radicals with 1 to 3 carbon atoms, which may be linked via a carbon atom, an oxygen atom or a nitrogen atom to form a ring containing 5 to 6 ring members, and Z represents an alkyl or cycloalkyl radical with at least 8, preferably 8 to 18, carbon atoms, which may be olefinically unsaturated, for example, an alkenyl or a cycloalkenyl radical with at least 8, preferably 8 to 18, carbon atoms, or the group —$(CH_2)_n$—X in which $n$ is a whole number of at least 2 and X is the hydroxyl or sulfhydryl group or the amino group which may be mono- or disubstituted.

$R_1$ and $R_2$ are advantageously methyl, ethyl, propyl or isopropyl groups. The group —$(CH_2)_n$— may be substituted by alkyl groups, that is to say it may have a branched carbon skeleton. When X represents the mono- or disubstituted amino group, any hydrocarbon radicals, advantageously low alkyl radicals, may be used as substituents. As a disubstituted amino group, a heterocyclic secondary amine radical, for example, the pyrrolidyl or piperidyl group, may be used.

A particularly pure acetoacetic acid methyl- or ethyl ester can be obtained by using a tertiary amine as catalyst in accordance with the invention which has a boiling point under atmospheric pressure that is at least 20° C. above that of acetoacetic acid methyl- or ethyl ester. When, in the above formula, Z represents the group —$(CH_2)_n$—X and X is the hydroxyl, sulfhydryl or amino group or a monosubstituted amino group, that is when X has a mobile hydrogen atom, the catalyst is acylated by the diketene. The boiling point of this acyl compound should advantageously also be at least 20° C. above that of the acetoacetic acid methyl- or ethyl ester. This mode of proceeding has the advantage that the total amount of catalyst remains in the sump when the reaction mixture is distilled at the end of the reaction.

Examples of suitable catalysts are N,N-dimethyloctylamine, N,N-diethyldodecylamine, N,N-dimethylstearylamine, N,N-dimethyloleylamine, N,N-dimethylethanolamine, N,N-dipropylethylenediamine, N,N-diisopropyl-N'- methylethylenediamine, N,N-diethyl - N'-phenyl-trimethylenediamine, N,N,N',N' - tetramethyl-hexamethylenediamine, N,N,N'-triethyl - N'-octyltetramethylenediamine, N-dodecylpiperidine, and N-octylmorpholine. Mixtures of these amines may also be used.

The tertiary amine or mixture of tertiary amines serving as catalyst is advantageously used in an amount within the range of 0.03 to 10%, preferably 0.1 to 4%, calculated on the weight of the methanol or ethanol used.

The process of the invention is advantageously carried out in a manner such that the alcohol to which the catalyst has been added and the diketene, which may be used in the form of a commercial product having a higher or lesser content of acetic acid or acetic anhydride and non-distillable residue, are introduced in a molar ratio into the head of a column, the heat of reaction being eliminated, for example, with the help of a dephlegmator.

For safety, it is advantageous to use a small excess of alcohol of 2 to 5% by weight calculated on the diketene. It is also possible to use larger excess amounts of alcohol, but this offers no further advantage. Since the reaction proceeds very rapidly, the finished crude ester can continuously be withdrawn from the sump of the column and subjected to fractional distillation.

It is also possible to proceed in a discontinuous manner and place the alcohol and the catalyst in a vessel provided with a stirrer or in an apparatus in which the reaction mixture is circulated by a pump, then introduce the diketene and process the mixture as described above.

As compared with the known process, the process of the invention has the advantage that the catalyst does not pass over into the distillate in the fractional distillation of the crude ester. This enables a considerably smaller reflux ratio to be adjusted in the distillation column, while the requirements made on the purity of the acetoacetic ester (content of acetic acid <0.1%, content of amine, calculated as $N_2$, <2 p.p.m.) remain the same, since, in the absence of volatile amines, the acetic acid and the acetoacetic acid methyl- or ethyl ester can be separated by distillation without difficulty.

Moreover, the distillation yields directly an acetic acid which is free from amine, whereas the acetic acid obtained by the known process must be freed from amine, which requires relatively great technical expenditure.

When, in the process of the invention, a commercial diketene containing, for example, 10% of acetic anhydride is used for the production of the crude ester, a total of about 50% of the distillation time is economized. This enables the expenditure of energy, chiefly for reduced pressure and steam for heating, to be reduced and the yield to be increased since acetoacetic acid methyl ester and acetoacetic acid ethyl ester are not quite stable at a temperature of 120° C., which is easily obtained in the distilling vessel, so that about 0.5% per hour of acetoacetic acid methyl- or ethyl ester is decomposed. Also, the non-distillable residue is more flowable if the distillation time is reduced so that the discharge of the distillation vessel is facilitated.

The following examples serve to illustrate the invention but they are not intended to limit it thereto.

EXAMPLE 1

200 liters=158 kilograms of methanol containing 150 grams of dimethylstearylamine, and 410 kilograms of commercial diketene containing 88% of diketene were introduced, per hour, through separate conduits into the head of a packed column 6 meters high and provided with a dephlegmator. The mixture boiled of its own. The crude acetoacetic acid methyl ester which was free from diketene was continuously withdrawn from the sump of the column and subjected in charges to fractional distillation. From 560 kilograms of crude ester, first runnings consisting of methanol, acetone and methyl acetate which partly passed over as an azeotropic mixture were obtained. Under a pressure of 37 millimeters of mercury then 22 kilograms of acetic acid and finally 475 kilograms (=95.5% of the theoretical) of acetoacetic acid methyl ester distilled over. The whole distillate was free from nitrogen-containing compounds.

EXAMPLE 2

In the apparatus described in Example 1, 250 liters =198 kilograms of ethanol containing 200 grams of dimethylaminoethanol, and 360 kilograms of commercial diketene containing 85.5% of diketene were reacted, per hour, in the manner described in Example 1. From the sump of the column crude acetoacetic acid ethyl ester which was free from diketene was continuously withdrawn and distilled in the manner described in Example 1. 452 kilograms (=94.9% of the theoretical) of pure acetoacetic acid ethyl ester free from amine were obtained. The dimethylamino-ethanol reacted with diketene during the reaction to form acetoacetic acid dimethylaminoethyl ester boiling at 120° C. under a pressure of 17 millimeters of mercury, which remained behind in the distillation residue.

EXAMPLE 3

In a circulation apparatus provided with a reflux condenser, 1150 grams of methanol and 10 grams of N,N, N',N'-tetramethylhexamethylenediamine were placed and circulated by a pump at a speed of 5 liters per hour. The mixture was heated to 60° C. and 3300 grams of commercial diketene containing 69% of diketene were run in, while cooling. The mixture was allowed to react for a further 30 minutes and was then distilled in a fractional column under atmospheric pressure. 520 grams of a mixture of methanol, acetone and methyl acetate were obtained. The pressure was then gradually reduced to a value of 17 millimeters of mercury and a fraction was obtained which contained 220 grams of acetic acid in addition to a small amount of acetoacetic acid methyl ester. The main fraction boiled at 66 to 68° C. under 17 millimeters of mercury and consisted of 2910 grams of pure acetoacetic acid methyl ester (=92.5% of the theoretical). By processing the acetic acid fraction, the yield could be increased to 94.5% of the theoretical. Both the acetic acid and the acetoacetic acid methyl ester were free from nitrogen-containing compounds.

We claim:

1. A process for the production of acetoacetic esters which comprises reacting diketene at a temperature below 120° C. with an alcohol selected from the group consisting of methanol and ethanol in the presence of 0.03 to 10%, calculated on the weight of said alcohol, of at least one tertiary amine of the formula

wherein $R_1$ and $R_2$ represent a member selected from the group consisting of an alkyl radical with 1 to 3 carbon atoms which are linked via a member selected from the group consisting of a carbon atom, an oxygen atom and a nitrogen atom to form a ring containing 5 to 6 ring members and an alkyl radical with 1 to 3 carbon atoms, and Z represents a member selected from the group consisting of an alkyl radical with 8 to 18 carbon atoms, a cycloalkyl radical with 8 to 18 carbon atoms, an alkenyl radical with 8 to 18 carbon atoms, a cycloalkenyl radical with 8 to 18 carbon atoms and the group $—(CH_2)_n—X$, wherein $n$ is a whole number of at least 2 and X is a member selected from the group consisting of the hydroxyl group, the sulfhydryl group, the amino group, a monosubstituted amino group having as a substituent a lower alkyl radical, and a disubstituted amino group having as a substituent a lower alkyl, a pyrrolidyl or a piperidyl radical; and recovering the ester products by distillation below 120° C.

2. The process of claim 1 wherein 0.1 to 4% of said catalyst is used.

3. The process of claim 1 wherein a member selected from the group consisting of N,N-dimethyloctyl-amine, N,N-diethyldodecylamine, N,N-dimethylstearylamine, N,N-dimethyloleylamine, N,N-dimethylethanolamine, N,N-dipropylethylenediamine, N,N-diisopropyl-N'-methylethylenediamine, N,N-diethyl - N' - phenyl-trimethylenediamine, N,N,N',N' - tetramethyl - hexamethylenediamine, N,N,N'-triethyl-N'-octyltetramethylenediamine, N-dodecylpiperidine, and N-octyl-morpholine is used as catalyst.

References Cited

UNITED STATES PATENTS 2,351,366   6/1944   Pohl et al. _____ 260—483

LORRAINE A. WEINBERGER, *Primary Examiner.*

V. GARNER, *Assistant Examiner.*